United States Patent
Asaura

(10) Patent No.: US 9,884,292 B2
(45) Date of Patent: Feb. 6, 2018

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Shinya Asaura, Numazu (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 316 days.

(21) Appl. No.: 14/714,380

(22) Filed: May 18, 2015

(65) Prior Publication Data

US 2015/0328585 A1    Nov. 19, 2015

(30) Foreign Application Priority Data

May 19, 2014  (JP) ................................. 2014-103589
Apr. 9, 2015  (JP) ................................. 2015-080175

(51) Int. Cl.
    *B01D 53/94*    (2006.01)
    *F01N 3/20*     (2006.01)
    *F01N 11/00*    (2006.01)

(52) U.S. Cl.
    CPC ..... *B01D 53/9431* (2013.01); *B01D 53/9495* (2013.01); *F01N 3/208* (2013.01); *F01N 3/2066* (2013.01); *F01N 11/00* (2013.01); *B01D 2258/01* (2013.01); *B01D 2315/00* (2013.01); *F01N 2260/14* (2013.01); *F01N 2560/026* (2013.01); *F01N 2560/06* (2013.01); *F01N 2610/02* (2013.01); *F01N 2900/0601* (2013.01); *F01N 2900/08* (2013.01); *F01N 2900/1404* (2013.01); *F01N 2900/1411* (2013.01); *Y02T 10/24* (2013.01)

(58) Field of Classification Search
    None
    See application file for complete search history.

(56) References Cited

U.S. PATENT DOCUMENTS

| 6,119,448 A | 9/2000 | Emmerling et al. |
| 2010/0319324 A1* | 12/2010 | Mital ............... F01N 3/021 60/286 |
| 2012/0174562 A1 | 7/2012 | Itoh |
| 2012/0216513 A1 | 8/2012 | Greber et al. |

FOREIGN PATENT DOCUMENTS

| WO | WO 2010/146285 A1 | 12/2010 |
| WO | WO 2011/033620 A1 | 3/2011 |

* cited by examiner

*Primary Examiner* — Walter D. Griffin
*Assistant Examiner* — Jelitza M Perez
(74) *Attorney, Agent, or Firm* — Finnegan, Henderson, Farabow, Garrett & Dunner, LLP

(57) ABSTRACT

An exhaust gas purification apparatus for an internal combustion engine includes an addition valve to add a precursor of ammonia or ammonia into an exhaust passage of the internal combustion engine, a sensor to detect NOx and ammonia at the upstream side of the addition valve, a channel cross section reducing part arranged at the downstream side of the addition valve, and a control device to limit the calculation of an amount of the precursor of ammonia or an amount of ammonia to be added from the addition valve based on a detection value of the sensor, or the calculation of a rate of NOx reduction based on the detection value of the sensor, in cases where a flow rate of exhaust gas flowing through the exhaust passage is equal to or more than a predetermined flow rate.

10 Claims, 9 Drawing Sheets

[Fig. 1]
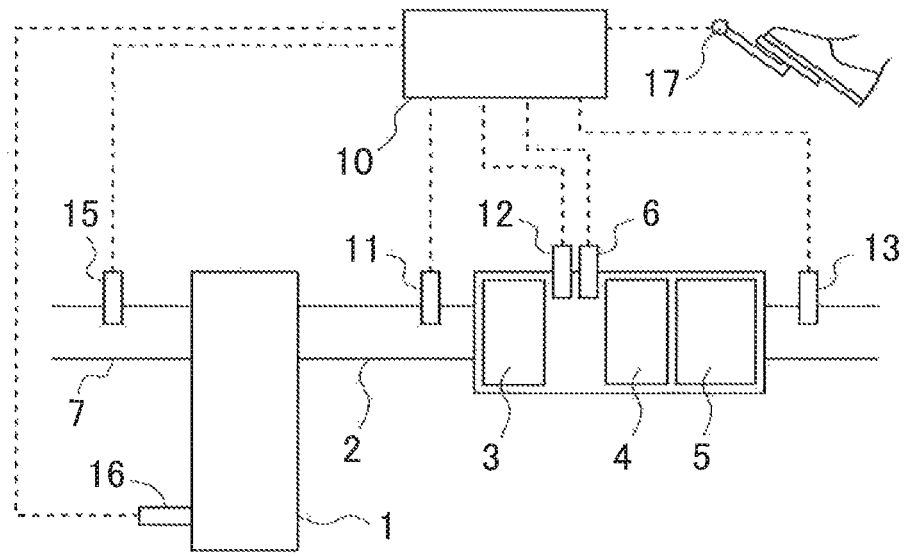
[Fig. 2]
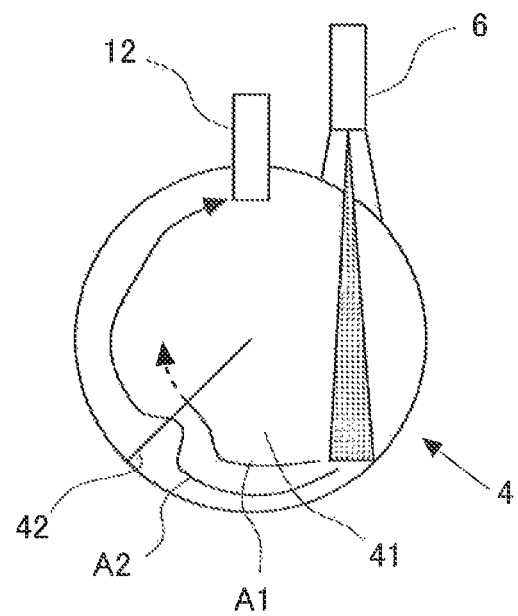

[Fig. 3]
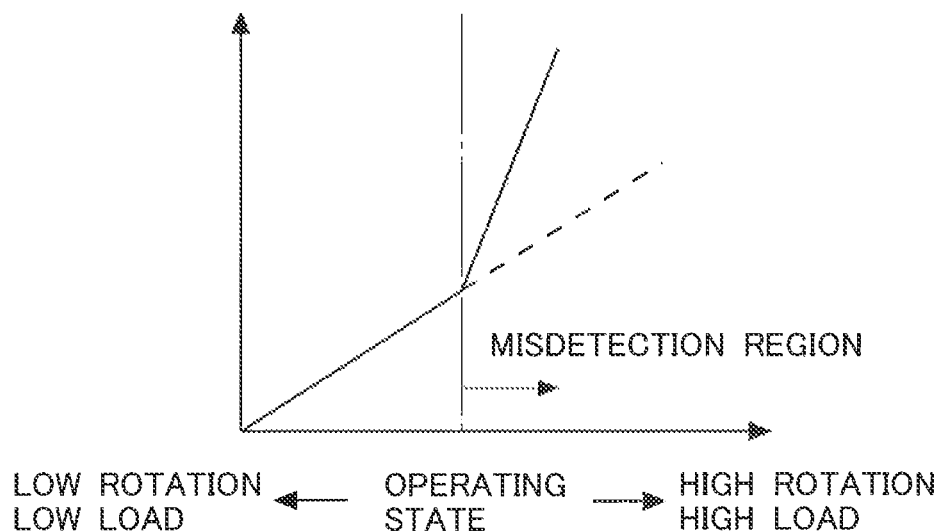
[Fig. 4]
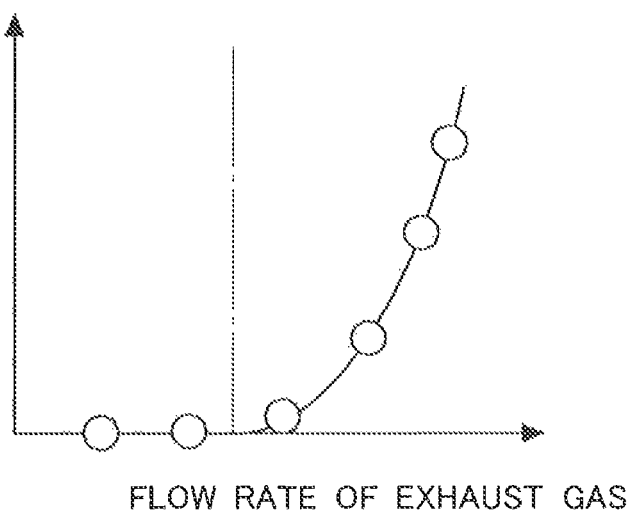

[Fig. 5]
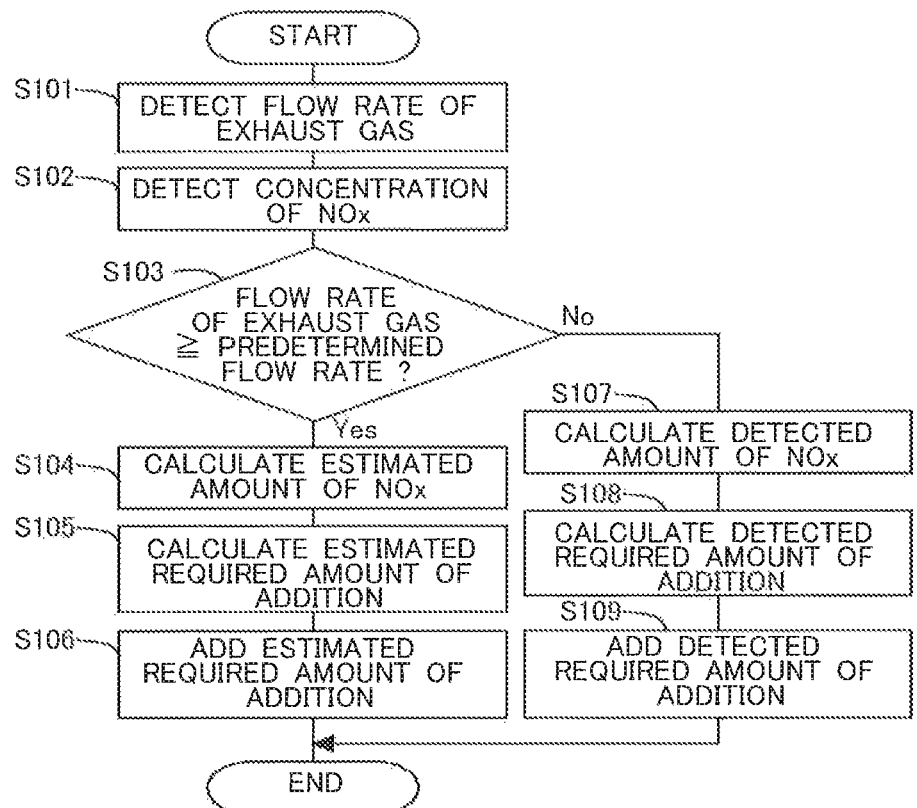
[Fig. 6]
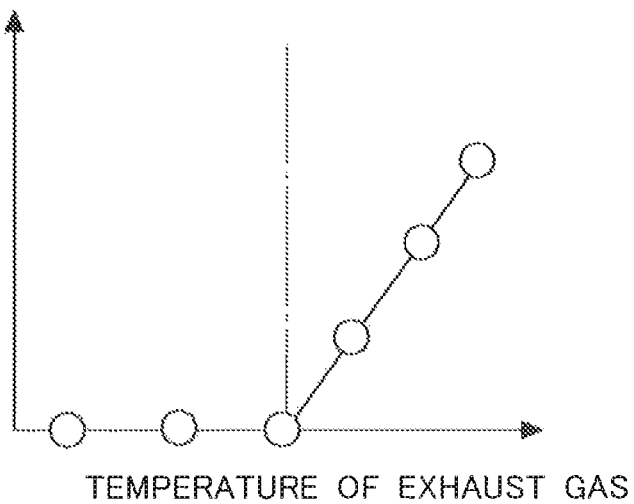

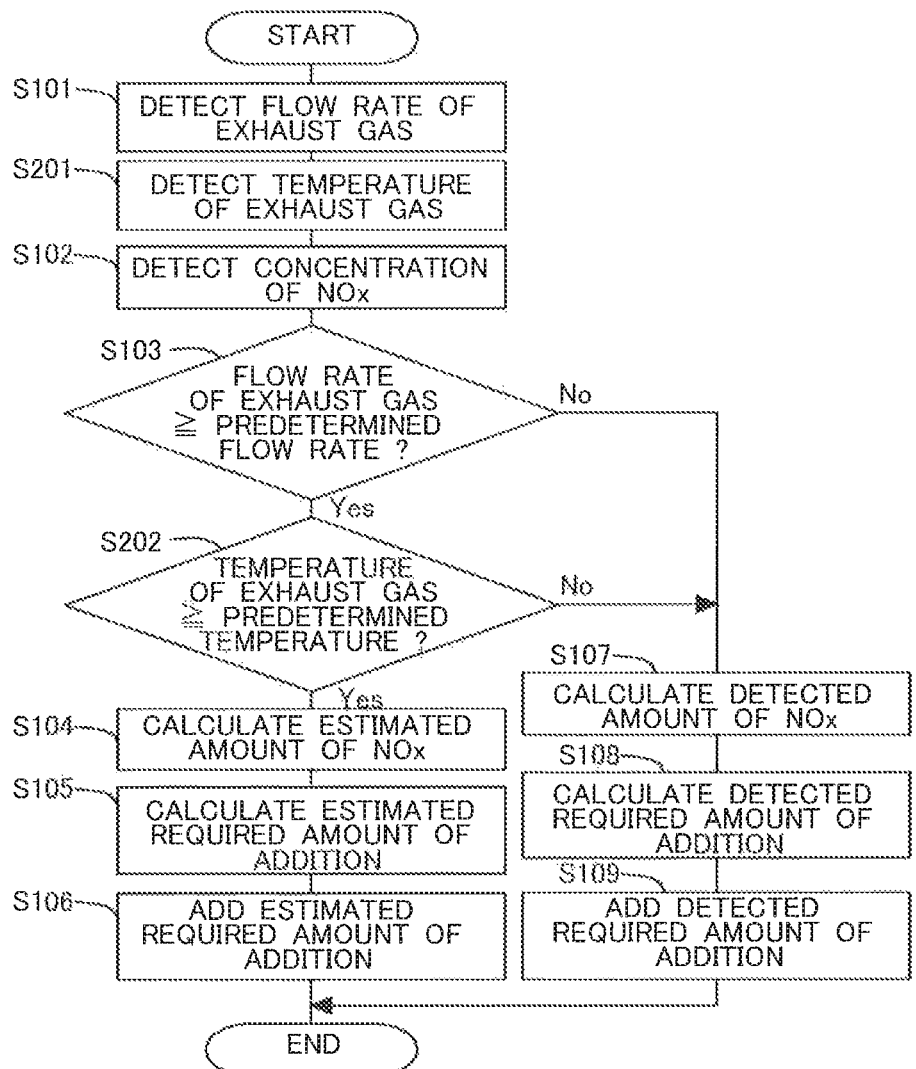
[Fig. 7]

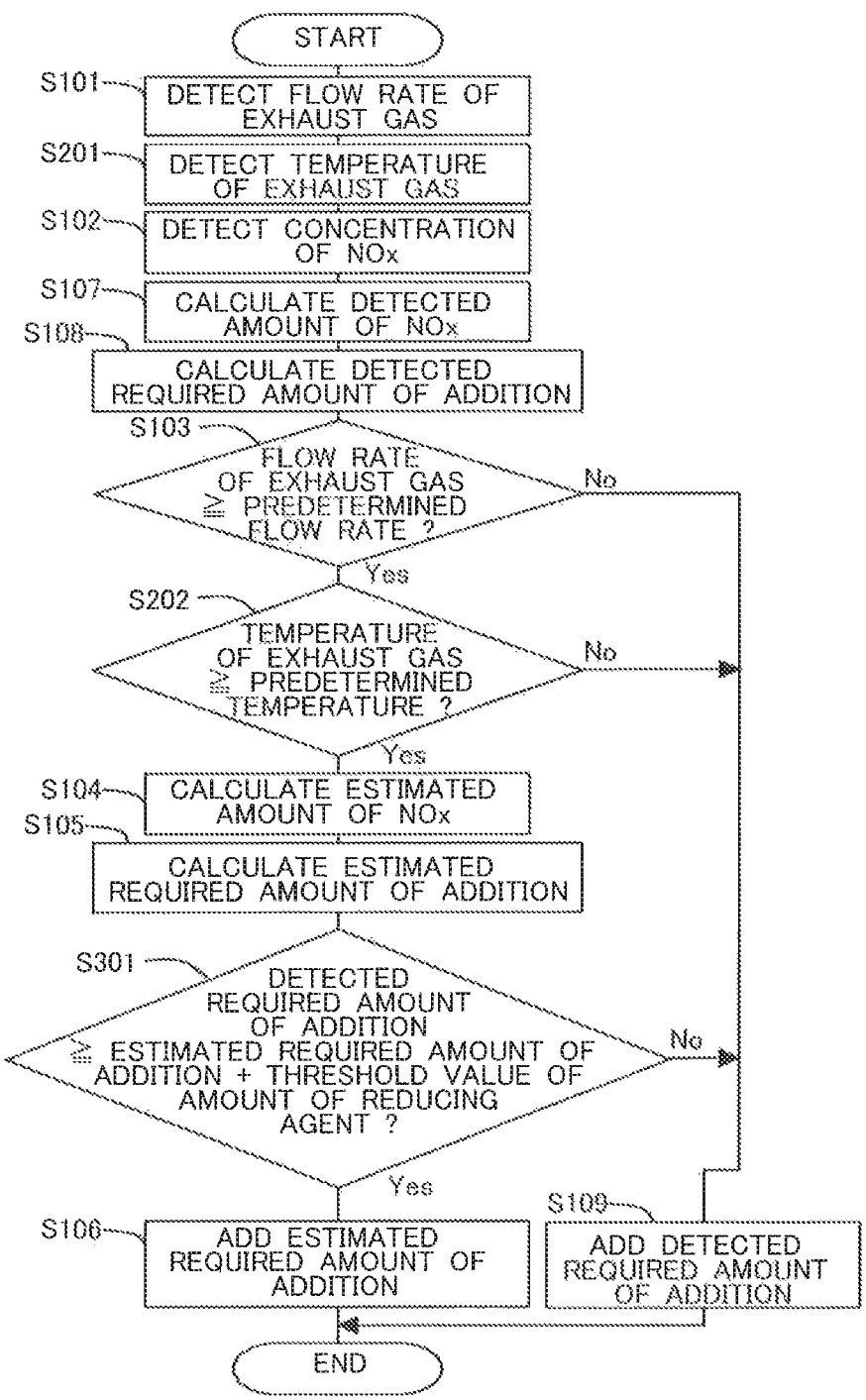

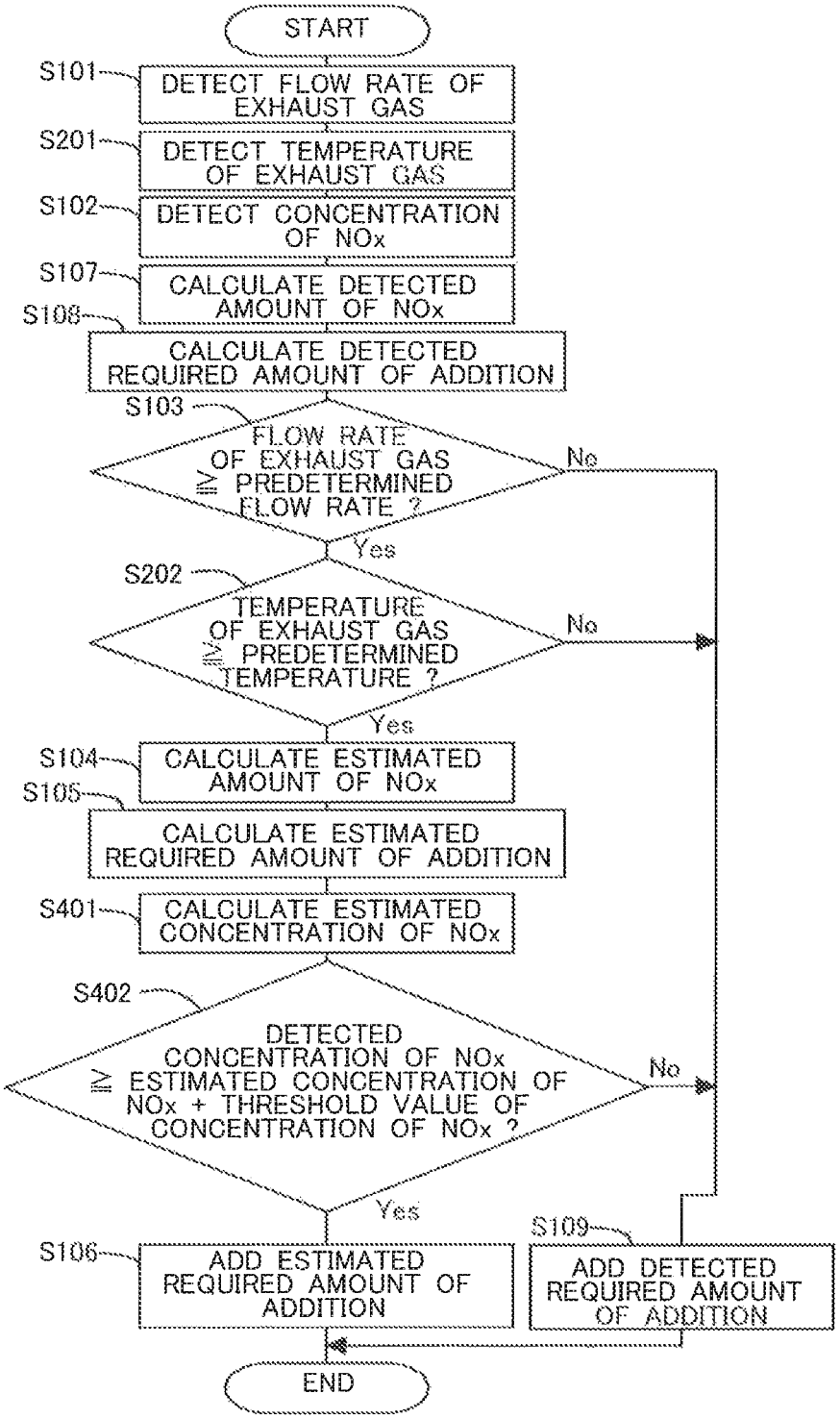
[Fig. 9]

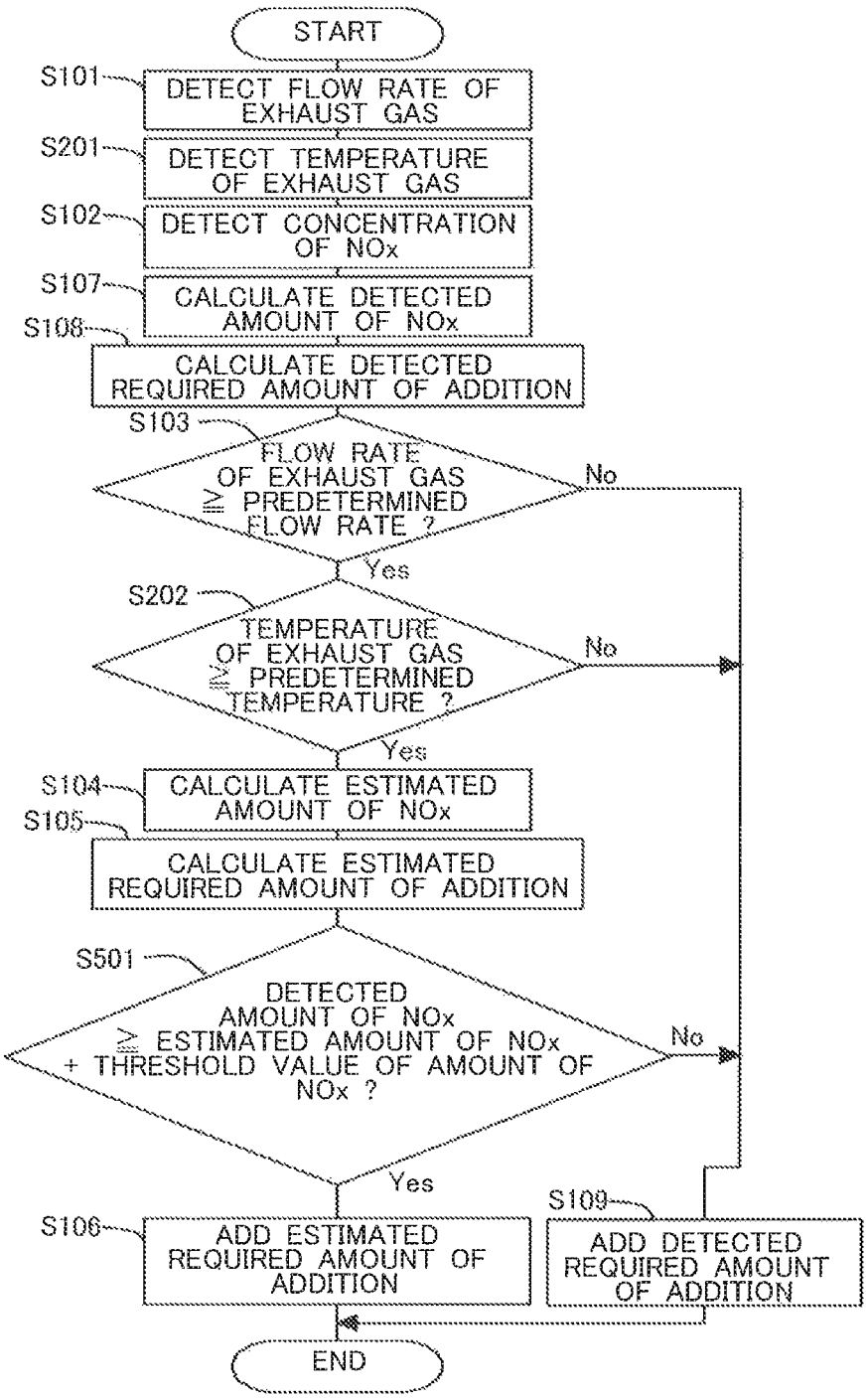
[Fig. 10]

[Fig. 11]
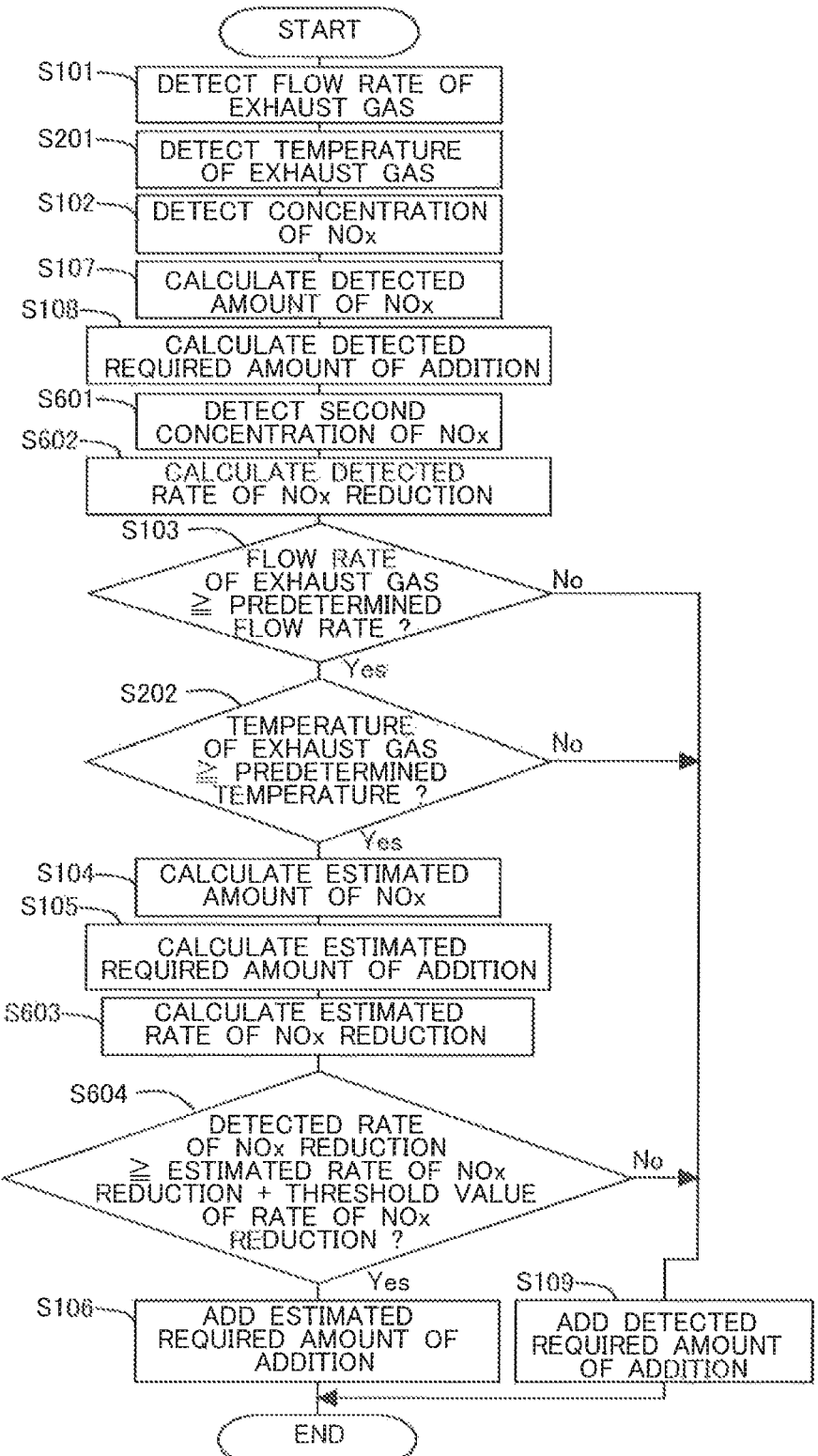

[Fig. 12]
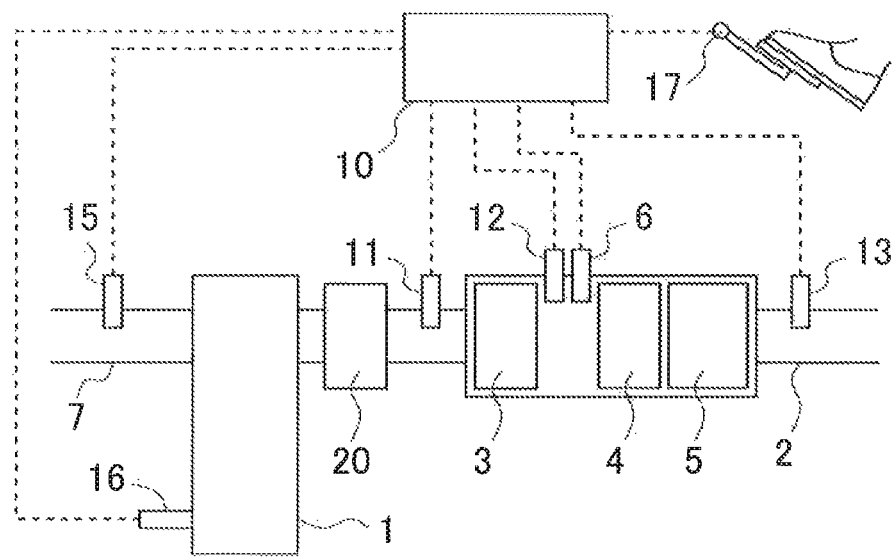
[Fig. 13]
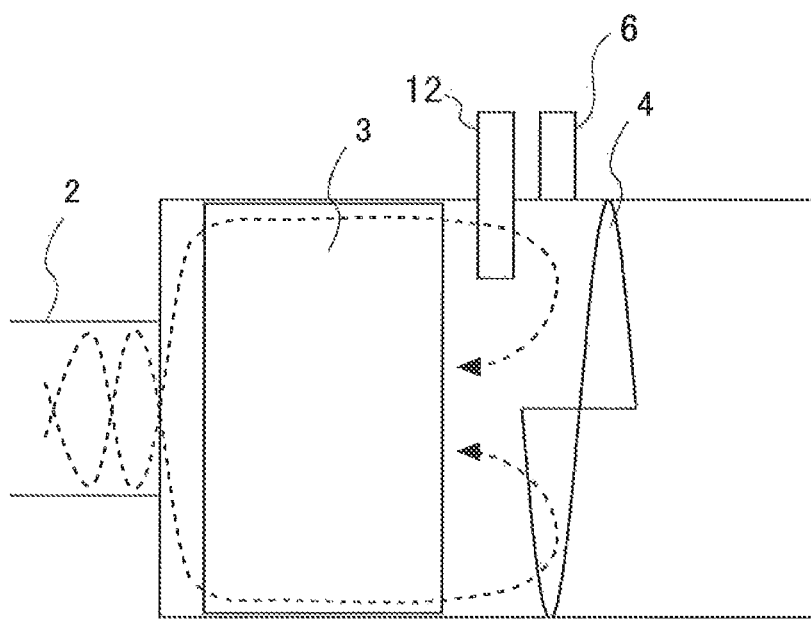

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2014-103589 filed on May 19, 2014 and claims priority to Japanese Patent Application No. 2015-080175 filed on Apr. 9, 2015, the entire contents of which are incorporated by reference herein."

BACKGROUND OF THE INVENTION

Field of the Invention

The present invention relates to an exhaust gas purification apparatus for an internal combustion engine.

Description of the Related Art

There has been known an NOx selective reduction catalyst (hereinafter, referred to simply as an "NOx catalyst") which purifies (removes or reduces) NOx contained in an exhaust gas from an internal combustion engine by using ammonia as a reducing agent. At the upstream side of the NOx catalyst, there is arranged an addition valve or the like which serves to add ammonia or a precursor of ammonia into the exhaust gas. As the precursor of ammonia, there can be mentioned urea, for example. Hereinafter, the precursor of ammonia or ammonia is also collectively referred to as "a reducing agent".

It is desirable that the reducing agent added from the addition valve be dispersed uniformly in the exhaust gas. Here, when the concentration of the reducing agent is not uniform in the NOx catalyst, there is a fear that the rate of NOx reduction may become low at locations where the concentration of the reducing agent is low, whereas the reducing agent may pass through the NOx catalyst at locations where the concentration of the reducing agent is high. For this reason, provision may be made for a disperser which serves to disperse the reducing agent widely in the exhaust gas (for example, refer to a first patent literature). This disperser is provided with a spiral passage which acts to disperse the reducing agent by causing the exhaust gas to swirl.

For example, in cases where an oxidation catalyst, an addition valve, a disperser and an NOx catalyst are arranged sequentially from an upstream side of an exhaust passage, the reducing agent can be quickly dispersed by means of the disperser. In the case of the disperser being not provided, it is necessary to provide a long distance between the addition valve and the NOx catalyst, in order to disperse the reducing agent. For this reason, the distance from the oxidation catalyst to the NOx catalyst also becomes long, so that a long time is taken for raising the temperature of the NOx catalyst, or a larger amount of fuel is required. On the other hand, the distance from the oxidation catalyst to the NOx catalyst can be shortened by the provision of the disperser.

However, in the disperser, the channel cross section thereof for the exhaust gas flowing therethrough generally becomes small, so when the exhaust gas passes through the dispenser, the dispenser provides resistance to the exhaust gas. For this reason, when the flow rate of the exhaust gas is large, a part of the exhaust gas, which can not pass through the disperser, may flow backwards in the exhaust passage. In addition, in the case of the disperser having a spiral passage, the part of the exhaust gas having not passed through the disperser may swirl in the same place.

In this manner, when the reducing agent is contained in the exhaust gas which flows backwards in the exhaust passage or swirls in the same place, there is a fear that in cases where an NOx sensor is arranged at the upstream site of the disperser, the reducing agent may arrive at the NOx sensor. Here, the NOx sensor also detects ammonia as well as NOx. Accordingly, when ammonia arrives at the NOx sensor, the detection value of the NOx sensor increases. For example, in cases where the reducing agent is supplied according to the concentration of NOx, the amount of addition of the reducing agent is made to increase according to the increase in the output value of the NOx sensor. In this case, an amount of reducing agent larger than an amount of NOx existing in the exhaust gas will be added. That is, the reducing agent more than needed will be added, thus causing an increase in the amount of consumption of the reducing agent.

Here, it is known that in cases where the reducing agent may arrive at the NOx sensor under the influence of the pulsation of the exhaust gas, the detection of NOx by the NOx sensor is stopped (for example, refer to a second patent literature). In this second patent literature, it is described that the higher the flow speed of the exhaust gas, the more difficult it becomes for the reducing agent to flow backwards. Then, when the flow speed of the exhaust gas exceeds a specified value, the detection of NOx by the NOx sensor is permitted, even in a period of time in which the reducing agent is added. However, as described above, the exhaust gas may flow backwards under the influence of other factors than the pulsation thereof.

PRIOR ART REFERENCES

Patent Literatures

First Patent Literature: International Publication No. 2010/146285

Second Patent Literature: International Publication No. 2011/033620

SUMMARY OF THE INVENTION

The present invention has been made in view of the problems as referred to above, and the object of the present invention is to suppress the occurrence of problems due to the detection of NOx and ammonia by means of a sensor.

In order to achieve the above-mentioned object, the present invention resides in an exhaust gas purification apparatus for an internal combustion engine which comprises: an addition valve that is arranged in an exhaust passage of the internal combustion engine, and configured to add a precursor of ammonia or ammonia into said exhaust passage; a sensor that is arranged in said exhaust passage at a location upstream of said addition valve, and configured to detect NOx and ammonia in the exhaust gas; a channel cross section reducing part that is arranged in said exhaust passage at a location downstream of said addition valve and has a flow passage for exhaust gas which is smaller in cross section than the exhaust passage at the upstream side of said addition valve; and a control device that configured to calculate an amount of the precursor of ammonia or an amount of ammonia to be added from said addition valve, or a rate of NOx reduction, wherein in cases where the flow rate of the exhaust gas flowing through said exhaust passage is equal to or more than a predetermined flow rate, said control device configured to limit the calculation of the amount of the precursor of ammonia or the amount of ammonia to be added from said addition valve based on the detection value of said sensor, or the calculation of the rate of NOx reduction based on the detection value of said sensor.

Said addition valve adds a reducing agent to an NOx catalyst that is arranged in said exhaust passage of said internal combustion engine, for example. Said NOx catalyst adsorbs ammonia in the exhaust gas, and selectively reduces NOx by using the ammonia as the reducing agent. As said channel cross section reducing part, there can be mentioned, by way of example, a disperser for dispersing the reducing agent in the exhaust gas or a filter that traps particulate matter (PM) in the exhaust gas. This filter may also support said NOx catalyst. That is, said channel cross section reducing part may also be arranged at the upstream side of said NOx catalyst, or said channel cross section reducing part and said NOx catalyst may also be arranged at the same place.

Said sensor is to detect NOx and ammonia, so even if only the detection value of said sensor is looked at or taken into account, it can not be distinguished whether the detection value is due to NOx or ammonia. For example, said NOx sensor is of a so-called type affected by the interference of ammonia, and so, has a characteristic that when ammonia is contained in exhaust gas, the ammonia is also detected as NOx. Accordingly, the detection value of said NOx sensor is based on the NOx and the ammonia which are contained in the exhaust gas.

Here, said sensor is arranged at the upstream side of said addition valve, and hence, in cases where the flow rate of the exhaust gas is relatively small, it is difficult for the reducing agent to arrive at said sensor. However, when the flow rate of the exhaust gas becomes relatively large, it becomes impossible for a part of the exhaust gas to pass through said channel cross section reducing part, and a backflow of the exhaust gas, etc., occurs, so that the reducing agent added from said addition valve may arrive at said sensor. In such a case, the calculation of the amount of the precursor of ammonia or the amount of ammonia to be added from said addition valve based on the detection value of said sensor is limited, or the calculation of the rate of NOx reduction based on the detection value of said sensor is limited.

The limitation of the calculation of the amount of the precursor of ammonia or the amount of ammonia to be added from said addition valve based on the detection value of said sensor, or the limitation of the calculation of the rate of NOx reduction based on the detection value of said sensor, can include the followings: the calculation is not carried out by using the detection value of said sensor as it is; the calculation is not carried out by using the detection value of said sensor; the calculation of the amount of addition of the reducing agent is not carried out by using the detection value of said sensor; the calculation of the rate of NOx reduction is not carried out by using the detection value of said sensor; the calculation is carried out by using an estimated value, instead of using the detection value of said sensor as it is; the calculation is carried out by correcting the detection value of said sensor, without using it as it is; the amount of addition of the reducing agent, which is calculated by using the detection value of said sensor as it is, is not used as it is, but is used after being corrected; and the rate of NOx reduction, which is calculated by using the detection value of said sensor as it is, is not used as it is, but is used after being corrected. Hereinafter, the limitation of the calculation of the amount of the precursor of ammonia or the amount of ammonia to be added from said addition valve based on the detection value of said sensor, or the limitation of the calculation of the rate of NOx reduction based on the detection value of said sensor, is also referred to simply as "the limitation of the calculation".

The predetermined flow rate can be made to be a flow rate of exhaust gas at which the exhaust gas is caused to flow backwards by means of said channel cross section reducing part, or a flow rate of exhaust gas at which the reducing agent flows toward said sensor. Moreover, in cases where the exhaust gas swirls in said channel cross section reducing part, the predetermined flow rate may also be a flow rate of exhaust gas at which the exhaust gas having not passed through said channel cross section reducing part swirls in the same place. In addition, the predetermined flow rate may also be a flow rate of exhaust gas which has a certain amount of margin with respect to the flow rate of the exhaust gas at which the exhaust gas is caused to flow backwards by means of said channel cross section reducing part, or a flow rate of exhaust gas at which the reducing agent flows toward said sensor, or a flow rate of exhaust gas which has a certain amount of margin with respect to the flow rate of the exhaust gas which swirls in the same place.

By the above-mentioned limitation of the calculation, it is possible to suppress an excessive supply of the reducing agent which would otherwise occur by using the detection value of the sensor affected by the influence of ammonia as it is. In addition, in cases where the rate of NOx reduction is calculated by using the detection value of the sensor and a diagnosis such as for example an abnormality diagnosis is carried out based on the rate of NOx reduction, it is possible to suppress an erroneous diagnosis.

In addition, said addition valve can add the precursor of ammonia into said exhaust passage, and said control device can limit the calculation of the amount of the precursor of ammonia to be added from said addition valve based on the detection value of said sensor, or the calculation of the rate of NOx reduction based on the detection value of said sensor, only in cases where said flow rate of the exhaust gas is equal to or more than said predetermined flow rate and the temperature of the exhaust gas is equal to or higher than a predetermined temperature at which the precursor of ammonia is converted to ammonia.

Here, in cases where the precursor of ammonia is supplied into the exhaust gas, when the temperature of the exhaust gas is equal to or higher than the predetermined temperature, the precursor of ammonia is converted to ammonia. For this reason, in cases where the temperature of the exhaust gas is less than the predetermined temperature, the precursor of ammonia will arrive at said sensor as it is. In this case, however, said sensor is not affected by the influence of the precursor of ammonia, so it is not necessary to carry out the limitation of the calculation. In this manner, it is possible to suppress the limitation of the calculation from being carried out more than necessary.

Moreover, said control device configured to calculate, based on the detection value of said sensor, a detected physical quantity, i.e., a physical quantity which is correlated with the detection value of said sensor and which becomes larger as the detection value of said sensor becomes larger, and calculate, based on an operating state of said internal combustion engine, an estimated physical quantity which is an estimated value of said physical quantity, wherein only in cases where the flow rate of said exhaust gas is equal to or more than said predetermined flow rate, and where a difference between said detected physical quantity and said estimated physical quantity is equal to or more than a threshold value, said control device configured to limit the calculation of the amount of the precursor of ammonia or the amount of ammonia to be added from said addition valve based on the detection value of said sensor, or limit the calculation of the rate of NOx reduction based on the detection value of said sensor.

In that case, it is possible to carry out the limitation of the calculation only when the influence of ammonia actually appears in the detection value of said sensor. The threshold value referred to herein is a value which represents the boundary of whether ammonia has been detected by said sensor. In this manner, it is possible to suppress the limitation of the calculation from being carried out more than necessary.

Further, said physical quantity may also be an amount of the precursor of ammonia or an amount of ammonia to be added from said addition valve.

That is, said control device may calculate the amount of the precursor of ammonia or the amount of ammonia to be added from said addition valve based on the detection value of said sensor, and may calculate the amount of the precursor of ammonia or the amount of ammonia to be added from said addition valve based on the operating state of said internal combustion engine, and said control device may also limit the calculation of the amount of the precursor of ammonia or the amount of ammonia to be added from said addition valve based on the detection value of said sensor, or the calculation of the rate of NOx reduction based on the detection value of said sensor, only in cases where the flow rate of said exhaust gas is equal to or more than said predetermined flow rate, and where a difference between said amount of the precursor of ammonia or said amount of ammonia calculated based on the detection value of said sensor, and said amount of the precursor of ammonia or said amount of ammonia calculated based on the operating state of said internal combustion engine is equal to or more than a threshold value of the amount of reducing agent.

In that case, it is possible to carry out the limitation of the calculation only when the influence of ammonia actually appears in the detection value of said sensor. The threshold value of the amount of reducing agent referred to herein is a value which represents the boundary of whether ammonia has been detected by said sensor. In this manner, it is possible to suppress the limitation of the calculation from being carried out more than necessary.

Furthermore, said physical quantity may also be a concentration of NOx in said exhaust passage.

That is, said control device may calculate the concentration of NOx in the exhaust gas at the upstream side of said sensor based on the operating state of said internal combustion engine, and said control device may also limit the calculation of the amount of the precursor of ammonia or the amount of ammonia to be added from said addition valve based on the detection value of said sensor, or the calculation of the rate of NOx reduction based on the detection value of said sensor, only in cases where the flow rate of said exhaust gas is equal to or more than said predetermined flow rate, and where a difference between the concentration of NOx obtained by said sensor and the concentration of NOx in the exhaust gas at the upstream side of said sensor calculated based on the operating state of said internal combustion engine is equal to or more than a threshold value of the concentration of NOx.

In this case, too, it is possible to carry out the limitation of the calculation only when the influence of ammonia actually appears in the detection value of said sensor. The threshold value of the concentration of NOx referred to herein is a value which represents the boundary of whether ammonia has been detected by said sensor.

In addition, said physical quantity may also be an amount of NOx in said exhaust passage.

That is, said control device may calculate an amount of NOx in the exhaust gas based on the detection value of said sensor, and may calculate an amount of NOx in the exhaust gas based on the operating state of said internal combustion engine, and said control device may also limit the calculation of the amount of the precursor of ammonia or the amount of ammonia to be added from said addition valve based on the detection value of said sensor, or the calculation of the rate of NOx reduction based on the detection value of said sensor, only in cases where the flow rate of said exhaust gas is equal to or more than said predetermined flow rate, and where a difference between the amount of NOx calculated based on the detection value of said sensor and the amount of NOx calculated based on the operating state of said internal combustion engine is equal to or more than a threshold value of the amount of NOx.

In this case, too, it is possible to carry out the limitation of the calculation only when the influence of ammonia actually appears in the detection value of said sensor. The threshold value of the amount of NOx referred to herein is a value which represents the boundary of whether ammonia has been detected by said sensor.

Moreover, a catalyst for reducing NOx by using ammonia as the reducing agent may be arranged in said exhaust passage at a location downstream of said channel cross section reducing part, wherein said physical quantity may also be a rate of NOx reduction in said catalyst.

That is, said catalyst may be arranged in said exhaust passage at a location downstream of said channel cross section reducing part, and said control device may calculate the rate of NOx reduction in said catalyst based on the detection value of said sensor, and may calculate the rate of NOx reduction in said catalyst based on the operating state of said internal combustion engine, and said control device may also limit the calculation of the amount of the precursor of ammonia or the amount of ammonia to be added from said addition valve based on the detection value of said sensor, or the calculation of the rate of NOx reduction based on the detection value of said sensor, only in cases where the flow rate of said exhaust gas is equal to or more than said predetermined flow rate, and where a difference between the rate of NOx reduction in said catalyst calculated based on the detection value of said sensor and the rate of NOx reduction in said catalyst calculated based on the operating state of said internal combustion engine is equal to or more than a threshold value of the rate of NOx reduction.

In this case, too, it is possible to carry out the limitation of the calculation only when the influence of ammonia actually appears in the detection value of said sensor. The threshold value of the rate of NOx reduction referred to herein is a value which represents the boundary of whether ammonia has been detected by said sensor.

Further, in the case of limiting the calculation of the amount of the precursor of ammonia or the amount of ammonia to be added from said addition valve based on the detection value of said sensor, or in the case of limiting the calculation of the rate of NOx reduction based on the detection value of said sensor, said control device can calculate the amount of the precursor of ammonia or the amount of ammonia to be added from said addition valve based on the operating state of said internal combustion engine, and can add the amount of the precursor of ammonia or the amount of ammonia thus calculated from said addition valve.

Because the operating state of the internal combustion engine (e.g., the engine rotation speed and the engine load) and the concentration of NOx in the exhaust gas (this may also be the amount of NOx) are in correlation with each other, it is possible to estimate the concentration of NOx or the amount of NOx in the exhaust gas based on the operating state of the internal combustion engine. Based on the concentration of NOx or the amount of NOx thus estimated, it is possible to decide the amount of addition of the reducing agent. Accordingly, even in the case where the limitation of the calculation is carried out, it will become possible to reduce NOx.

In addition, said sensor may be arranged in a position at which the precursor of ammonia or the ammonia, which is added from said addition valve when the flow rate of the exhaust gas flowing through said exhaust passage is equal to or more than said predetermined flow rate, arrives at the time when the direction of the flow of the exhaust gas is changed by said channel cross section reducing part.

The time when the direction of the flow of the exhaust gas is changed by said channel cross section reducing part is, for example, a time when the exhaust gas is caused to flow backwards by the reduction of the channel cross section or a time when the exhaust gas is caused to swirl in the same place by said channel cross section reducing part. That is, this is a case where a part of the exhaust gas can not pass through said channel cross section reducing part, so that the precursor of ammonia or ammonia flows toward said sensor. In such a case, when said sensor and said addition valve are arranged separate or distant from each other to a sufficient extent, the precursor of ammonia or ammonia does not arrive at said sensor, even if there occurs a backflow of the exhaust gas, etc. On the other hand, in cases where said sensor is arranged in a position at which the precursor of ammonia or ammonia may arrive, said sensor can be affected by the influence of ammonia. In the case of such an arrangement, when there is a fear that said sensor may be affected by the influence of ammonia, the amount of addition of the reducing agent can be suitably adjusted by carrying out the limitation of the calculation. In addition, the distance between said sensor and said addition valve becomes relatively short, thus making it possible to reduce the size of the entire apparatus.

Moreover, at the time of limiting the calculation of the amount of the precursor of ammonia or the amount of ammonia to be added from said addition valve based on the detection value of said sensor, or at the time of limiting the calculation of the rate of NOx reduction based on the detection value of said sensor, said control device can correct at least one of the detection value of said sensor, the amount of the precursor of ammonia or the amount of ammonia to be added from said addition valve calculated based on the detection value of said sensor, and the rate of NOx reduction calculated based on the detection value of said sensor.

By carrying out the above-mentioned correction, it is possible to reduce the influence of ammonia. That is, by correcting the detection value of said sensor, it is possible to suitably adjust the amount of addition of the reducing agent calculated based on the detection value of said sensor thus amended. In addition, even if the detection value of said sensor is not corrected, it is possible to suitably adjust the amount of addition of the reducing agent by correcting another physical quantity calculated based on the detection value of said sensor, too. That is, the amount of addition of the reducing agent can be suitably adjusted by correcting the amount of the reducing agent to be added from said addition valve, which is calculated based on the detection value of said sensor. Moreover, in the case where the amount of addition of the reducing agent is decided based on the rate of NOx reduction, the amount of addition of the reducing agent can be suitably adjusted by correcting the rate of NOx reduction, too. Further, in cases where an abnormality diagnosis of the apparatus is carried out by using the detection value of said sensor, it is possible to improve the accuracy of the diagnosis.

According to the present invention, it is possible to suppress the occurrence of problems due to the detection of NOx and ammonia by means of a sensor.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 1 is a view showing the schematic construction of an intake system and an exhaust system of an internal combustion engine according to a first, a second and a third embodiment of the present invention.

FIG. 2 is a view when looking at a mixer from an upstream side thereof.

FIG. 3 is a view showing the relation between an operating state of the internal combustion engine and a required value of an amount of addition of urea.

FIG. 4 is a view showing the relation between the flow rate of exhaust gas and the turn-around ratio of exhaust gas.

FIG. 5 is a flow chart showing a flow for reducing agent addition control according to the first embodiment of the present invention.

FIG. 6 is a view showing the relation between the temperature of exhaust gas and the amount of generation of ammonia.

FIG. 7 is a flow chart showing a flow for reducing agent addition control according to the second embodiment of the present invention.

FIG. 8 is a flow chart showing a flow for reducing agent addition control according to the third embodiment of the present invention.

FIG. 9 is a flow chart showing a flow for reducing agent addition control according to the third embodiment of the present invention.

FIG. 10 is a flow chart showing a flow for reducing agent addition control according to the third embodiment of the present invention.

FIG. 11 is a flow chart showing a flow for reducing agent addition control according to the third embodiment of the present invention.

FIG. 12 is a view showing the schematic construction of an intake system and an exhaust system of an internal combustion engine according to a fourth embodiment of the present invention.

FIG. 13 is a view showing the flow of exhaust gas downstream of a turbocharger by a broken line.

MODES FOR CARRYING OUT THE INVENTION

Hereinafter, the best modes for carrying out the present invention will be exemplarily described in detail based on preferred embodiments with reference to the attached drawings. However, the dimensions, materials, shapes, relative arrangements and so on of component parts described in the embodiments are not intended to limit the scope of the present invention to these alone in particular as long as there are no specific statements.

First Embodiment

FIG. 1 is a view showing the schematic construction of an intake system and an exhaust system of an internal combustion engine 1 according to a first embodiment of the present invention. The internal combustion engine 1 is a diesel engine for driving a vehicle. However, the internal combustion engine 1 may be a gasoline engine. An exhaust passage 2 is connected to the internal combustion engine 1. In the exhaust passage 2, there are arranged an oxidation catalyst 3, a mixer 4 and an NOx catalyst 5 sequentially in this order from an upstream side.

The oxidation catalyst 3 should only be a catalyst which has an oxidation ability, and may be a three-way catalyst, for example. The NOx catalyst 5 is an NOx selective catalytic reduction catalyst which carries out selective reduction of NOx in exhaust gas by using ammonia as a reducing agent. Here, note that in this embodiment, the NOx catalyst 5 corresponds to a catalyst in the present invention.

The mixer 4 is provided with a plate-shaped member which has a plate thickness direction arranged in a central axis direction of the exhaust passage 2, and is adapted to be displaced to a downstream side, while turning around the central axis of the exhaust passage 2 in one direction. This plate-shaped member is disposed in a spiral manner so as to extend around the central axis of the exhaust passage 2. The spiral disposition of the plate-shaped member serves to form an opening portion (i.e., a spiral passage), through which the exhaust gas flows. Then, in the mixer 4, the exhaust gas flows in a spiral manner, so that it swirls at the downstream side of the mixer 4. As a result, mixing of the reducing agent and the exhaust gas is promoted by the swirling flow of the exhaust gas. Here, note that the shape of the mixer 4 is not limited to this. For example, there may be used a member which changes the direction of the flow of the exhaust gas, or increases the turbulence of the exhaust gas. In this embodiment, the mixer 4 corresponds to a channel cross section reducing part in the present invention.

A first NOx sensor 12 for detecting the concentration of NOx in the exhaust gas and an addition valve 6 are arranged at a location downstream of the oxidation catalyst 3 and upstream of the mixer 4. The first NOx sensor 12 serves to detect the amount of NOx in the exhaust gas. The addition valve 6 serves to add urea water into the exhaust gas, in order to generate ammonia which acts as the reducing agent in the NOx catalyst 5. The urea water is a precursor of ammonia. Here, note that the addition valve 6 may add ammonia. The first NOx sensor 12 is arranged at the upstream side of the addition valve 6. The "upstream side" referred to herein is an upstream side in the central axis direction of the exhaust passage 2. Here, in cases where the first NOx sensor 12 and the addition valve 6 are disposed close to the mixer 4, the first NOx sensor 12 is arranged at the upstream side of the spiral passage in the mixer 4, and the addition valve 6 is arranged at the downstream side of the spiral passage. Even in this case, the first NOx sensor 12 is arranged at the upstream side of the central axis direction of the exhaust passage 2. Here, note that in this embodiment, the first NOx sensor 12 corresponds to a sensor in the present invention.

Further, at the downstream side of the NOx catalyst 5, there is arranged a second NOx sensor 13 for detecting the NOx in the exhaust gas flowing out of the NOx catalyst 5.

In addition, at the upstream side of the oxidation catalyst 3, there is arranged a temperature sensor 11 for detecting the temperature of the exhaust gas.

On the other hand, an intake passage 7 is connected to the internal combustion engine 1. An air flow meter 15 for detecting the flow rate of intake air is arranged in the intake passage 7.

Then, in the internal combustion engine 1, there is provided an electronic control unit (ECU) 10 in combination therewith. The ECU 10 is a unit that controls an operating state of the internal combustion engine 1, an exhaust gas purification apparatus, and so on. A crank position sensor 16 and an accelerator opening sensor 17, in addition to the temperature sensor 11, the first NOx sensor 12, the second NOx sensor 13, and the air flow meter 15 as referred to above, are electrically connected to the ECU 10, so that the detection values of these individual sensors are passed or transmitted to the ECU 10. Here, note that in this embodiment, the ECU 10 corresponds to a control device in the present invention.

The ECU 10 is able to grasp the operating state of the internal combustion engine 1, such as the engine rotation speed based on the detection of the crank position sensor 16, the engine load based on the detection of the accelerator opening sensor 17, etc. Here, note that in this embodiment, the NOx in the exhaust gas flowing into the NOx catalyst 5 is able to be detected by the first NOx sensor 12, but the NOx contained in the exhaust gas discharged from the internal combustion engine 1 (the exhaust gas before being purified or reduced in the NOx catalyst 5, i.e., the exhaust gas flowing into the NOx catalyst 5) has a relation with the operating state of the internal combustion engine 1, and hence, is also able to be estimated based on the above-mentioned operating state of the internal combustion engine 1. In addition, the ECU 10 is able to estimate the temperature of the NOx catalyst 5 based on the temperature of the exhaust gas detected by the temperature sensor 11. Moreover, the ECU 10 is able to estimate the flow rate of the exhaust gas based on the amount of intake air detected by the air flow meter 15.

Then, according to the concentration of NOx (this may also be the amount of NOx) in the exhaust gas which is detected or estimated, the ECU 10 gives an instruction to the addition valve 6, so that the reducing agent in an amount necessary for the reduction of NOx is added or supplied into the exhaust gas. The amount of reducing agent to be added from the addition valve 6 can be adjusted by adjusting the valve opening time and the valve opening interval of the addition valve 6.

In addition, the ECU 10 can also calculate a detected rate of NOx reduction in the NOx catalyst 5 based on the detection values of the first NOx sensor 12 and the second NOx sensor 13. Here, the detected rate of NOx reduction is obtained as follows.

the detected rate of NOx reduction=(the detection value of the first NOx sensor 12−the detection value of the second NOx sensor 13)/the detection value of the first NOx sensor 12

Moreover, an abnormality diagnosis of the first NOx sensor 12, the addition valve 6, or the NOx catalyst 5 can also be carried out, based on the rate of NOx reduction thus obtained.

Here, the first NOx sensor 12 and the second NOx sensor 13 are subjected to the interference of ammonia. For this reason, when ammonia is contained in the exhaust gas flowing into a detection part of each of the first NOx sensor 12 and the second NOx sensor 13, it will be detected as NOx.

In consideration of this, the first NOx sensor 12 is disposed at the upstream side of the addition valve 6. However, the reducing agent added from the addition valve 6 may arrive at the first NOx sensor 12.

FIG. 2 is a view when looking at the mixer 4 from an upstream side thereof. In the mixer 4, the spiral passage 41 is formed by the plate-shaped or spiral member, so in FIG. 2, the exhaust gas swirls in a clockwise direction (i.e., in an arrowed direction). The first NOx sensor 12 and the addition valve 6 are disposed sequentially from the upstream side in the swirling direction of the exhaust gas. For this reason, when the flow rate of the exhaust gas is small, most of the reducing agent added from the addition valve 6 goes along the spiral passage 41 (A1 in FIG. 2). At this time, the exhaust gas passes through the opening portion 42, and flows out of the mixer 4. For this reason, the reducing agent hardly arrives at the first NOx sensor 12.

On the other hand, when the flow rate of the exhaust gas becomes equal to or more than a predetermined flow rate, a part of the exhaust gas having gone along the spiral passage 41 can not pass through the opening portion 42, and may go around the spiral passage 41 once again (A2 in FIG. 2). That is, in the opening portion 42, the exhaust gas returns to the upstream side of the swirling flow. In this case, the reducing agent added from the addition valve 6 can arrive at the first NOx sensor 12. Here, note that the predetermined flow rate may also be a flow rate of the exhaust gas at which a part of the exhaust gas can not pass through the opening portion 42 and goes around the spiral passage 41 once again. In addition, the predetermined flow rate may also be a flow rate of the exhaust gas at the time when the amount of reducing agent, which arrives at the first NOx sensor 12 due to the fact that a part of the exhaust gas can not pass through the opening portion 42, exceeds an allowable range.

Accordingly, in this embodiment, in the case where the flow rate of the exhaust gas is the equal to or more than the predetermined flow rate, the calculation of the amount of addition of the reducing agent based on the detection value of the first NOx sensor 12 or the calculation of the rate of NOx reduction based on the detection value of the first NOx sensor 12 is limited. That is, the limitation of the calculation is carried out. The limitation of the calculation can include the followings: the detection value of the first NOx sensor 12 is not used as it is; the detection value of the first NOx sensor 12 is not used; the detection value of the first NOx sensor 12 is used after being corrected, instead of being used as it is; and the detection value of the first NOx sensor 12 is used, but the amount of addition of the reducing agent or the rate of NOx reduction calculated from the detection value of the first NOx sensor 12 is corrected.

FIG. 3 is a view showing the relation between the operating state of the internal combustion engine 1 and a required value of an amount of addition of urea. The operating state of the internal combustion engine 1 on the axis of abscissa is the engine rotation speed or the engine load. The required value of the amount of addition of urea on the axis of ordinate is a required value of the amount of urea to be added from the addition valve 6, and is calculated based on the detection value of the first NOx sensor 12. That is, an amount of urea without excess or deficiency to reduce the amount of NOx obtained based on the detection value of the first NOx sensor 12 is the required value of the amount of addition of urea.

The higher the engine rotation speed or the engine load becomes, the larger the flow rate of the exhaust gas becomes, and in addition, the larger the amount of NOx in the exhaust gas also becomes, and hence, the larger the required value of the amount of addition of urea becomes. Here, in FIG. 3, an alternate long and short dash line represents an operating state in which the flow rate of the exhaust gas becomes the predetermined flow rate. When the flow rate of the exhaust gas becomes equal to or more than the predetermined flow rate and ammonia arrives at the first NOx sensor 12, the concentration of NOx detected by the first NOx sensor 12 (hereinafter, also referred to as the detected concentration of NOx) becomes higher, as compared with the actual concentration of NOx (hereinafter, also referred to as the actual concentration of NOx). For this reason, the amount of addition of urea calculated according to the detected concentration of NOx becomes more than an amount of addition of urea which is required in order to actually reduce NOx. In FIG. 3, a broken line represents a required value of the amount of addition of urea which corresponds to the actual concentration of NOx, and a solid line represents a required value of the amount of addition of urea which corresponds to the detected concentration of NOx. In a misdetection region in FIG. 3, the detected concentration of NOx becomes higher than the actual concentration of NOx, so that the first NOx sensor 12 is affected by the influence of ammonia, thus making it difficult for the first NOx sensor 12 to detect the concentration of NOx in an accurate manner. Thus, in the misdetection region, the required value of the amount of addition of urea becomes more than the amount of urea actually required.

FIG. 4 is a view showing the relation between the flow rate of exhaust gas and the turn-around ratio of exhaust gas. The turn-around ratio is a rate of the amount of the exhaust gas which can not pass through the opening portion 42, with respect to the amount of the exhaust gas flowing through in front of the opening portion 42. An alternate long and short dash line represents the predetermined flow rate. When the flow rate of the exhaust gas is equal to or more than the predetermined flow rate, the turn-around ratio becomes larger than 0. Then, in the case where the flow rate of the exhaust gas is equal to or more than the predetermined flow rate, the higher the turn-around ratio of the exhaust gas, the larger the turn-around ratio becomes, and hence, the larger the amount of reducing agent which arrives at the first NOx sensor 12 becomes.

In contrast to this, in this embodiment, in cases where the flow rate of the exhaust gas is equal to or more than the predetermined flow rate, the calculation of the amount of addition of the reducing agent using the detected concentration of NOx is not carried out.

FIG. 5 is a flow chart showing a flow for reducing agent addition control according to the first embodiment of the present invention. This flow or routine is carried out by means of the ECU 10 at each predetermined time interval.

In step S101, the flow rate of the exhaust gas is detected. This is the flow rate of the exhaust gas discharged from the internal combustion engine 1, or the flow rate of the exhaust gas flowing into the NOx catalyst 5. The flow rate of the exhaust gas has a relation with the amount of intake air which is detected, for example, by the air flow meter 15, and hence, is calculated based on the amount of intake air thus detected.

In step S102, the concentration of NOx is detected. The concentration of NOx thus detected is a value obtained by actually detecting the concentration of NOx in the exhaust gas discharged from the internal combustion engine 1, and is the detection value of the first NOx sensor 12. That is, the detected concentration of NOx has been obtained in this step.

In step S103, it is determined whether the flow rate of the exhaust gas detected in step S101 is equal to or more than the predetermined flow rate. In this step, it is determined whether the exhaust gas is in a state where the first NOx catalyst 12 is able to detect ammonia. According to this, it is determined whether the detection value of the first NOx sensor 12 is used. In cases where an affirmative determination is made in step S103, the routine goes to step S104, whereas in cases where a negative determination is made, the routine goes to step S107.

In step S104, an estimated amount of NOx is calculated. The estimated amount of NOx is an estimated value of the amount of NOx in the exhaust gas discharged from the internal combustion engine 1 per unit time, and is calculated based on the operating state of the internal combustion engine 1 (e.g., the engine rotation speed, the engine load, etc.). Here, there is a relation between the operating state of the internal combustion engine 1 and the amount of NOx discharged from the internal combustion engine 1, and hence, it is possible to estimate the estimated amount of NOx based on the operating state of the internal combustion engine 1. Here, note that the relation between the operating state of the internal combustion engine 1 and the estimated amount of NOx can be obtained in advance by experiments, simulations, or the like.

In step S105, an estimated required amount of addition is calculated. The estimated required amount of addition is a minimum amount of addition of the reducing agent required at least in order to reduce all the estimated amount of NOx calculated in step S104.

In step S106, the estimated required amount of addition calculated in step S105 is added, and thereafter, this flow chart or routine is ended.

On the other hand, in step S107, a detected amount of NOx is calculated. The detected amount of NOx is an amount of NOx in the exhaust gas discharged from the internal combustion engine 1 per unit time, and is an amount of NOx calculated based on the flow rate of the exhaust gas detected in step S101, and the detected concentration of NOx detected in step S102.

In step S108, a detected required amount of addition is calculated. The detected required amount of addition is a minimum amount of addition of the reducing agent required at least in order to reduce all the detected amount of NOx calculated in step S107.

In step S109, the detected required amount of addition calculated in step S108 is added, and thereafter, this flow chart or routine is ended.

In the flow chart shown in FIG. 5, in cases where a negative determination is made in step S103, the amount of addition of the reducing agent is calculated, without using the detection value of the first NOx sensor 12. This can be said that the limitation of the calculation is carried out.

In the past, it has been considered that the reducing agent flows backwards due to the pulsation of the exhaust gas when the flow rate of the exhaust gas is small, but in cases where a resistance such as the mixer 4 exists in the exhaust passage 2, the reducing agent can flow backwards when the flow rate of the exhaust gas is large. In this embodiment, even if the detection value of the first NOx sensor 12 is made large due to ammonia in the case where the flow rate of the exhaust gas is large, it is possible to suppress the amount of addition of the reducing agent from becoming too large or excessive. As a result of this, it is possible to suppress the reducing agent from passing through the NOx catalyst 5, as well as to reduce the amount of consumption of the reducing agent. In addition, the distance between the oxidation catalyst to the NOx catalyst 5 can be made short by the provision of the mixer 4, but in the case where the first NOx sensor 12 and the addition valve 6 are provided between the oxidation catalyst 3 and the NOx catalyst 5, the distance between the first NOx sensor 12 and the addition valve 6 becomes close. For this reason, the influence of the reducing agent being caused to flow backwards by the mixer 4 may become large. However, in the exhaust gas purification apparatus with such an arrangement, the effect or advantage of the present invention becomes much larger.

Here, note that in this embodiment, the limitation of the calculation is carried out according to the flow rate of the exhaust gas, but instead of this, the limitation of the calculation may be carried out according to the engine rotation speed or the engine load. Here, the flow rate of the exhaust gas changes with the engine rotation speed and the engine load. The higher the engine rotation speed, and the higher the engine load, the larger the flow rate of the exhaust gas becomes. Accordingly, when the engine rotation speed is equal to or more than a predetermined speed, or when the engine load is equal to or more than a predetermined load, the limitation of the calculation may be carried out. The predetermined speed and the predetermined load can be obtained in advance by experiments, simulations or the like, as a value at which the reducing agent can arrive at the first NOx sensor 12.

In addition, in this embodiment, in cases where the flow rate of the exhaust gas is equal to or more than the predetermined flow rate, the amount of addition of the reducing agent is calculated based on the estimated amount of NOx. Instead of this, in this embodiment, in the case where the flow rate of the exhaust gas is equal to or more than the predetermined flow rate, the detected amount of NOx may be calculated after correcting the detection value of the first NOx sensor 12, and then, the detected required amount of addition may be calculated based on the detected amount of NOx thus calculated. Here, note that instead of correcting the detection value of the first NOx sensor, the detected required amount of addition may be corrected.

Because there is a relation between the flow rate of the exhaust gas and the turn-around ratio of the exhaust gas, as shown in FIG. 4, when considering that the reducing agent also turns around the first NOx sensor 12 at this ratio, it is possible to calculate the amount of reducing agent arriving at the first NOx sensor 12, based on the flow rate of the exhaust gas. The detected concentration of NOx can be corrected by subtracting an amount of increase of the detection value of the first NOx sensor 12 due to this reducing agent from the detected concentration of NOx. Here, note that the relation shown in FIG. 4 can be obtained in advance through experiments, simulations, or the like.

Moreover, in step S106, the reducing agent is added by adjusting the amount of addition of the reducing agent to the estimated required amount of addition, but instead of this, the addition of the reducing agent may be inhibited.

Further, in this embodiment, reference has been made to the case where the limitation of the calculation is carried to suppress an excessive supply of the reducing agent, which would otherwise occur by using the detection value of the sensor affected by the influence of ammonia as it is, but a similar consideration can be made, in cases where abnormality diagnosis is carried out by using the detection value of the first NOx sensor 12. For example, the rate of NOx reduction can be calculated by using the detection value of the first NOx sensor 12 and the detection value of the second NOx sensor 13, and then, the abnormality diagnosis of the NOx catalyst 5 can be carried out by using the rate of NOx reduction thus obtained. In such a case, when the detection value of the first NOx sensor 12 is affected by the influence of the backflow of the reducing agent, there is a fear of an erroneous diagnosis. In contrast to this, in the case where the exhaust gas is in a state where the first NOx catalyst 12 is able to detect ammonia, the erroneous diagnosis can be suppressed by inhibiting the calculation of the rate of NOx reduction using the detection value of the first NOx sensor 12, or by inhibiting the abnormality diagnosis using the detection value of the first NOx sensor 12. In addition, instead of inhibiting the calculation of the rate of NOx reduction, the rate of NOx reduction may be calculated, and then, the rate of NOx reduction thus calculated may be corrected. In the case of correcting the rate of NOx reduction, for example, the larger the flow rate of the exhaust gas, the more ammonia tends to be detected by the first NOx sensor 12. For this reason, the larger the flow rate of the exhaust gas, the larger a correction value or a correction coefficient for the rate of NOx reduction may be made. This correction value or correction coefficient can be obtained in advance through experiments, simulations, or the like.

In this embodiment, the mixer 4 has been explained as an example of the channel cross section reducing part according to the present invention, but instead of this, a filter for trapping particulate matter in the exhaust gas can also be used as the channel cross section reducing part. The NOx catalyst may also be supported by this filter. In cases where the flow rate of the exhaust gas is equal to or more than the predetermined flow rate, the filter may become resistance, and the exhaust gas may flow backwards, so that the reducing agent can arrive at the first NOx sensor 12. Here, note that only filter may be provided without the provision of the mixer 4, the arrangement may be such that both the mixer 4 and the filter are provided. In the case of the provision of both the mixer 4 and the filter, both of the mixer 4 and the filter may also be used in combination as the channel cross section reducing part, or either one of the mixer 4 and the filter may also be used as the channel cross section reducing part.

Second Embodiment

In the first embodiment, it is determined based on the flow rate of the exhaust gas whether the limitation of the calculation is to be carried out, but in this second embodiment, such a determination is made in further consideration of the temperature of the exhaust gas.

Here, in cases where the urea water is added from the addition valve 6, when the temperature of the exhaust gas is low, it is difficult for urea to convert to ammonia. For this reason, the urea water thus added may arrive at the first NOx sensor 12 in the state of urea before conversion to ammonia. Even if the urea water arrives at the first NOx sensor 12 in the state of urea, the detection value of the first NOx sensor 12 does not change, so there is no problem even if the detection value of the first NOx sensor 12 is used.

FIG. 6 is a view showing the relation between the temperature of exhaust gas and the amount of generation of ammonia. The amount of generation of ammonia is an amount of the ammonia converted from urea. An alternate long and short dash line represents a predetermined temperature at which urea is caused to convert to ammonia. At temperatures less than the predetermined temperature at which urea is caused to convert to ammonia, ammonia is not generated. On the other hand, at temperatures equal to or higher than the predetermined temperature, ammonia is generated, and in addition, the higher the temperature, the larger the amount of generation of ammonia becomes.

Accordingly, in this second embodiment, only in cases where the flow rate of the exhaust gas is equal to or more than the predetermined flow rate and the temperature of the exhaust gas is equal to or higher than a predetermined temperature at which urea is converted to ammonia, the limitation of the calculation is carried out.

FIG. 7 is a flow chart showing a flow for reducing agent addition control according to the second embodiment of the present invention. This flow or routine is carried out by means of the ECU 10 at each predetermined time interval. Here, note that for those steps in which the same processing as in the aforementioned flow chart is carried out, the same symbols are attached and the explanation thereof is omitted.

In the flow chart or routine shown in FIG. 7, when the processing of step S101 is completed, the routine goes to step S201. In step S201, the temperature of the exhaust gas is detected. The temperature of the exhaust gas is detected by the temperature sensor 11.

In addition, in the flow chart shown in FIG. 7, when an affirmative determination is made in step S103, the routine goes to step S202. In step S202, it is determined whether the temperature of the exhaust gas detected in step S201 is equal to or higher than the predetermined temperature. The predetermined temperature is a temperature at which urea converts to ammonia. That is, in this step, it is determined whether urea converts to ammonia. In cases where an affirmative determination is made in step S202, the routine goes to step S104, whereas in cases where a negative determination is made, the routine goes to step S107.

In this manner, in cases where the flow rate of the exhaust gas is equal to or more than the predetermined flow rate and the temperature of the exhaust gas is equal to or higher than the predetermined temperature, the limitation of the calculation is carried out. In the case of others, the reducing agent is added by using the detection value of the first NOx sensor 12.

Here, note that the temperature of the exhaust gas relates to the operating state of the internal combustion engine 1, so it is also possible to estimate the temperature of the exhaust gas based on the operating state of the internal combustion engine 1. Accordingly, the temperature sensor 11 can also be omitted. In addition, the temperature of the wall of the exhaust passage 2 can also be used in place of the temperature of the exhaust gas. Moreover, in cases where the temperature of the exhaust gas is equal to or higher than the predetermined temperature, the detection value of the first NOx sensor 12 may be corrected based on the temperature of the exhaust gas. Here, the higher the temperature of the exhaust gas, the higher the proportion of the urea which converts to ammonia becomes, and so, the larger the detection value of the first NOx sensor 12 becomes. Accordingly, correction may be made in such a manner that the higher the temperature of the exhaust gas, the smaller the detection value of the first NOx sensor 12 becomes. The relation between the temperature of the exhaust gas and the corrected value of the detection value of the first NOx sensor 12 has been obtained in advance by experiments, simulations; or the like. Here, note that the amount of addition of the reducing agent or the rate of NOx reduction calculated based on the detection value of the first NOx sensor 12 may be corrected. In the case of correcting the rate of NOx reduction, for example, the larger the flow rate of the exhaust gas, or the higher the temperature of the exhaust gas, the more ammonia tends to be detected by the first NOx sensor 12. For this reason, the larger the flow rate of the exhaust gas, or the higher the temperature of the exhaust gas, the larger a correction value or a correction coefficient for the rate of NOx reduction may be made. This correction value or correction coefficient can be obtained in advance through experiments, simulations, or the like.

Third Embodiment

In this third embodiment, in cases where the detected required amount of addition is larger, by a threshold value of the amount of reducing agent or more, than the estimated required amount of addition, the limitation of the calculation is carried out.

Here, it may be considered that even if the flow rate of the exhaust gas is equal to or more than the predetermined flow rate or the temperature of the exhaust gas is equal to or higher than the predetermined temperature, the detection value of the first NOx sensor 12 is not affected by the influence of ammonia. In addition, it may also be considered that even if the detection value of the first NOx sensor 12 is affected by the influence of ammonia, an amount of change of the detection value is as small as can be ignored. Accordingly, in this third embodiment, the limitation of the calculation is carried out only in cases where the detection value of the first NOx sensor 12 changes under the influence of ammonia to such an extent as can not be ignored.

FIG. 8 is a flow chart showing a flow for reducing agent addition control according to the third embodiment of the present invention. This flow or routine is carried out by means of the ECU 10 at each predetermined time interval. Here, note that for those steps in which the same processing as in the aforementioned flow charts is carried out, the same symbols are attached and the explanation thereof is omitted.

In the flow chart shown in FIG. 8, when the processing of step S102 is completed, step S107 and step S108 are processed, and thereafter, the routine further goes to step S103. Here, note that in the flow chart shown in FIG. 8, step S201 and step S202 can also be omitted.

In the flow chart or routine shown in FIG. 8, when the processing of step S105 is completed, the routine goes to step S301. In step S301, it is determined whether the detected required amount of addition is equal to or more than a value which is the sum of the estimated required amount of addition and the threshold value of the amount of reducing agent. The threshold value of the amount of reducing agent referred to herein is a value which represents the boundary of whether ammonia has been detected by the first NOx sensor 12. In addition, the threshold value of the amount of reducing agent may also be an increase of the detected required amount of addition due to the ammonia in the case where the detected required amount of addition is affected by the influence of ammonia. Even when an affirmative determination is made in each of step S103 and step S202, the detected required amount of addition is added, if the detected required amount of addition is not larger, by the threshold value of the amount of reducing agent or more, than the estimated required amount of addition. In cases where an affirmative determination is made in step S301, the routine goes to step S106, whereas in cases where a negative determination is made, the routine goes to step S109.

Moreover, in this third embodiment, in cases where the detected concentration of NOx is higher, by a threshold value of the concentration of NOx or more, than a concentration of NOx calculated based on the operating state of the internal combustion engine 1 (hereinafter an estimated concentration of NOx), the limitation of the calculation may be carried out. Here, note that the estimated concentration of NOx is a value which estimates a concentration of NOx at the upstream side of the first NOx sensor 12 or in the vicinity of the first NOx sensor 12. The estimated concentration of NOx can also be said as a value which estimates the concentration of NOx detected by the first NOx sensor 12. Then, by making a comparison between the detected concentration of NOx and the estimated concentration of NOx, it is determined whether the detection value of the first NOx sensor 12 is affected by the influence of ammonia.

FIG. 9 is a flow chart showing a flow for reducing agent addition control according to the third embodiment of the present invention. This flow or routine is carried out by means of the ECU 10 at each predetermined time interval. Here, note that for those steps in which the same processing as in the aforementioned flow charts is carried out, the same symbols are attached and the explanation thereof is omitted. Here, note that in the flow chart shown in FIG. 9, step S201 and step S202 can be omitted.

In the flow chart or routine shown in FIG. 9, when the processing of step S105 is completed, the routine goes to step S401, where the estimated concentration of NOx is calculated. The estimated concentration of NOx is an estimated value of the concentration of NOx in the exhaust gas discharged from the internal combustion engine 1, and is calculated based on the operating state of the internal combustion engine 1 (e.g., the engine rotation speed, the engine load, etc.). Here, there is a relation between the operating state of the internal combustion engine 1 and the concentration of NOx in the exhaust gas discharged from the internal combustion engine 1, and hence, it is possible to estimate the estimated concentration of NOx based on the operating state of the internal combustion engine 1. Here, note that the relation between the operating state of the internal combustion engine 1 and the estimated concentration of NOx can be obtained in advance by experiments, simulations, or the like. When the processing of step S401 is completed, the routine goes to step S402.

In step S402, it is determined whether the detected concentration of NOx is equal to or more than a value which is the sum of the estimated concentration of NOx and the threshold value of the concentration of NOx. The threshold value of the concentration of NOx referred to herein is a value which represents the boundary of whether ammonia has been detected by the first NOx sensor 12. In addition, the threshold value of the concentration of NOx may also be an increase of the detected concentration of NOx due to the ammonia in the case where the detected concentration of NOx is affected by the influence of ammonia. Even when an affirmative determination is made in each of step S103 and step S202, the detected required amount of addition is added, if the detected concentration of NOx is not higher, by the threshold value of the concentration of NOx or more, than the estimated concentration of NOx. In cases where an affirmative determination is made in step S402, the routine goes to step S106, whereas in cases where a negative determination is made, the routine goes to step S109.

Further, in this third embodiment, in cases where the detected amount of NOx is larger, by a threshold value of the amount of NOx or more, than the estimated amount of NOx, the limitation of the calculation is carried out. That is, by making a comparison between the detected amount of NOx and the estimated amount of NOx, it is determined whether the detection value of the first NOx sensor 12 is affected by the influence of ammonia.

FIG. 10 is a flow chart showing a flow for reducing agent addition control according to the third embodiment of the present invention. This flow or routine is carried out by means of the ECU 10 at each predetermined time interval. Here, note that for those steps in which the same processing as in the aforementioned flow charts is carried out, the same symbols are attached and the explanation thereof is omitted. Here, note that in the flow chart shown in FIG. 10, step S201 and step S202 can be omitted.

In the flow chart or routine shown in FIG. 10, when the processing of step S105 is completed, the routine goes to step S501. In step S501, it is determined whether the detected amount of NOx is equal to or more than a value which is the sum of the estimated amount of NOx and the threshold value of the amount of NOx. The threshold value of the amount of NOx referred to herein is a value which represents the boundary of whether ammonia has been detected by the first NOx sensor 12. In addition, the threshold value of the amount of NOx may also be an increase of the detected amount of NOx due to the ammonia in the case where the detected amount of NOx is affected by the influence of ammonia. Even when an affirmative determination is made in each of step S103 and step S202, the detected required amount of addition is added, if the detected amount of NOx is not larger, by the threshold value of the amount of NOx or more, than the estimated amount of NOx. In cases where an affirmative determination is made in step S501, the routine goes to step S106, whereas in cases where a negative determination is made, the routine goes to step S109.

Further, in this third embodiment, in cases where a rate of NOx reduction in the NOx catalyst 5 calculated based on the detection values of the first NOx sensor 12 and the second NOx sensor 13 (hereinafter, also referred to as a detected rate of NOx reduction) is higher, by the threshold value of the rate of NOx reduction or more, than a rate of NOx reduction in the NOx catalyst 5 estimated based on the operating state of the internal combustion engine 1 (hereinafter, also referred to as an estimated rate of NOx reduction), the limitation of the calculation may be carried out. As described above, the detected rate of NOx reduction is obtained as follows.

the detected rate of NOx reduction=(the detection value of the first NOx sensor 12–the detection value of the second NOx sensor 13)/the detection value of the first NOx sensor 12

Ammonia in the exhaust gas is adsorbed to the NOx catalyst 5, and hence, even in a state where ammonia is detected in the first NOx sensor 12, ammonia is hardly detected in the second NOx sensor 13. Accordingly, when the detection value of the first NOx sensor 12 becomes high under the influence of ammonia, the detected rate of NOx reduction will become high. For this reason, by making a comparison between the detected rate of NOx reduction and the estimated rate of NOx reduction, it is determined whether the detection value of the first NOx sensor 12 is affected by the influence of ammonia.

FIG. 11 is a flow chart showing a flow for reducing agent addition control according to the third embodiment of the present invention. This flow or routine is carried out by means of the ECU 10 at each predetermined time interval. Here, note that for those steps in which the same processing as in the aforementioned flow charts is carried out, the same symbols are attached and the explanation thereof is omitted. Here, note that in the flow chart shown in FIG. 10, step S201 and step S202 can be omitted.

In the flow chart or routine shown in FIG. 11, when the processing of step S108 is completed, the routine goes to step S601. In step S601, NOx is detected by the second NOx sensor 12. The concentration of NOx detected at this time is set as a second concentration of NOx. Then, the routine goes to step S602, where the detected rate of NOx reduction is calculated. When the processing of step S602 is completed, the routine goes to step S103.

In addition, in the flow chart or routine shown in FIG. 11, when the processing of step S105 is completed, the routine goes to step S603, where the estimated rate of NOx reduction is calculated. Here, the rate of NOx reduction in the NOx catalyst 5 is associated with the temperature of the NOx catalyst 5 (this may also be the temperature of the exhaust gas) and the flow rate of the exhaust gas (this may also be the amount of intake air), and hence, the relation between these factors can have been obtained and stored in advance through experiments, simulations, or the like, thereby making it possible to calculate the estimated rate of NOx reduction. Here, note that the temperature of the NOx catalyst 5 and the flow rate of the exhaust gas may be estimated based on the number of engine revolutions per unit time and the engine load. It can be said that in this step S603, the estimated rate of NOx reduction is calculated based on the operating state of the internal combustion engine 1. When the processing of step S603 is completed, the routine goes to step S604.

In step S604, it is determined whether the detected rate of NOx reduction is equal to or more than a value which is the sum of the estimated rate of NOx reduction and the threshold value of the rate of NOx reduction. The threshold value of the rate of NOx reduction referred to herein is a value which represents the boundary of whether ammonia has been detected by the first NOx sensor 12. In addition, the threshold value of the rate of NOx reduction may also be an increase of the detected rate of NOx reduction due to the ammonia in the case where the detected rate of NOx reduction is affected by the influence of ammonia. Even when an affirmative determination is made in each of step S103 and step S202, the detected required amount of addition is added, if the detected rate of NOx reduction is not higher, by the threshold value of the rate of NOx reduction or more, than the estimated rate of NOx reduction. In cases where an affirmative determination is made in step S604, the routine goes to step S106, whereas in cases where a negative determination is made, the routine goes to step S109.

Here, note that, in this third embodiment, reference has been made, by way of example, to the case where when calculating the amount of addition of the reducing agent, the limitation of the calculation is carried out. On the other hand, in cases where when calculating the rate of NOx reduction, the limitation of the calculation is carried out, a similar consideration can be made. In this case, in place of the step S106, the calculation of the rate of NOx reduction using the detection value of the first NOx sensor 12 is inhibited, or the rate of NOx reduction is calculated by using the detection value of the first NOx sensor 12, and then, the rate of NOx reduction thus calculated is corrected. In the case of correcting the rate of NOx reduction, for example, the larger the flow rate of the exhaust gas, the larger a correction value or a correction coefficient for the rate of NOx reduction may be made. This correction value or correction coefficient can be obtained in advance through experiments, simulations, or the like. In addition, in place of the step S109, the rate of NOx reduction is calculated by using the detection value of the first NOx sensor 12. Moreover, in this third embodiment, an explanation has been given by mentioning, as examples, the required amount of addition, the concentration of NOx, the amount of NOx, and the rate of NOx reduction. On the other hand, even in the case of other physical quantities, they can be applied. That is, when a difference between a physical quantity (hereinafter, also referred to as a detected physical quantity), which is correlated with the detection value of the first NOx sensor 12 and which increases in accordance with the increasing detection value of the first NOx sensor 12, and an estimated value (hereinafter, also referred to as an estimated physical quantity) of the physical quantity calculated based on the operating state of the internal combustion engine 1 is equal to or larger than a threshold value, the limitation of the calculation can be carried out.

Fourth Embodiment

FIG. 12 is a view showing the schematic construction of an intake system and an exhaust system of an internal combustion engine 1 according to a fourth embodiment of the present invention. In this fourth embodiment, a turbocharger 20 is arranged at the upstream side of the oxidation catalyst 3. The other devices, parts and so on are the same as those in the above-mentioned embodiments, so the explanation thereof is omitted.

FIG. 13 is a view showing the flow of exhaust gas downstream of the turbocharger 20 by a broken line. Here, when the exhaust gas passes through the turbocharger 20, the exhaust gas swirls around the central axis of the exhaust passage 2. The exhaust gas is deviated or displaced in the direction of the wall surface of the exhaust passage 2 due to a centrifugal force generated at this time. The larger the flow rate of the exhaust gas, the more remarkable this deviation or displacement becomes. Because of this deviation or displacement of the exhaust gas, the pressure at the side of the central axis of the exhaust passage 2 becomes relatively lower than that at the side of the wall surface of the exhaust passage 2. For this reason, in cases where the distance between the turbocharger 20 and the oxidation catalyst 3 is relatively close, the pressure in the oxidation catalyst 3 at the side of the central axis thereof becomes lower than that at the outer peripheral side thereof. When the exhaust gas arrives at the mixer 4 in such a state, there is a fear that the exhaust gas having passed through the outer peripheral side of the oxidation catalyst 3 may flow backwards to the central axis side of the oxidation catalyst 3 due to the resistance of the mixer 4. If the exhaust gas flows backwards in this manner, the reducing agent added from the addition valve 6 can arrive at the first NOx sensor 12.

Even in such an arrangement, the limitation of the calculation can be carried out, similarly to the above-mentioned embodiments.

While the invention has been described in terms of the preferred embodiments, those skilled in the art will recognize that the invention can be practiced with modifications within the spirit and scope of the appended claims.

What is claimed is:

1. An exhaust gas purification apparatus for an internal combustion engine comprising:
an addition valve that is arranged in an exhaust passage of the internal combustion engine, and configured to add a precursor of ammonia or ammonia into said exhaust passage;
a sensor that is arranged in said exhaust passage at a location upstream of said addition valve, and configured to detect NOx and ammonia in the exhaust gas;
a disperser that is arranged in said exhaust passage at a location downstream of said addition valve and has a flow passage for exhaust gas which is smaller in cross section than the exhaust passage at the upstream side of said addition valve; and
a controller configured to calculate an amount of the precursor of ammonia or an amount of ammonia to be added from said addition valve, or a rate of NOx reduction, wherein in cases where the flow rate of the exhaust gas flowing through said exhaust passage is equal to or more than a predetermined flow rate, said controller configured to limit the calculation of the amount of the precursor of ammonia or the amount of ammonia to be added from said addition valve based on the detection value of said sensor, or the calculation of the rate of NOx reduction based on the detection value of said sensor.

2. The exhaust gas purification apparatus for an internal combustion engine as set forth in claim 1, wherein
said addition valve configured to add the precursor of ammonia into said exhaust passage; and
said controller configured to limit the calculation of the amount of the precursor of ammonia to be added from said addition valve based on the detection value of said sensor, or limit the calculation of the rate of NOx reduction based on the detection value of said sensor, only in cases where said flow rate of the exhaust gas is equal to or more than said predetermined flow rate and the temperature of the exhaust gas is equal to or higher than a predetermined temperature at which the precursor of ammonia is converted to ammonia.

3. The exhaust gas purification apparatus for an internal combustion engine as set forth in claim 1, wherein
said controller further configured to calculate, based on the detection value of said sensor, a detected physical quantity which is a physical quantity correlated with the detection value of said sensor and which becomes larger as the detection value of said sensor becomes larger, and calculate, based on an operating state of said internal combustion engine, an estimated physical quantity which is an estimated value of said physical quantity; and
said controller further configured to limit the calculation of the amount of the precursor of ammonia or the amount of ammonia to be added from said addition valve based on the detection value of said sensor, or limit the calculation of the rate of NOx reduction based on the detection value of said sensor, only in cases where the flow rate of said exhaust gas is equal to or more than said predetermined flow rate, and where a difference between said detected physical quantity and said estimated physical quantity is equal to or more than a threshold value.

4. The exhaust gas purification apparatus for an internal combustion engine as set forth in claim 3, wherein
said physical quantity is an amount of the precursor of ammonia or an amount of ammonia to be added from said addition valve.

5. The exhaust gas purification apparatus for an internal combustion engine as set forth in claim 3, wherein
said physical quantity is a concentration of NOx in said exhaust passage.

6. The exhaust gas purification apparatus for an internal combustion engine as set forth in claim 3, wherein
said physical quantity is an amount of NOx in said exhaust passage.

7. The exhaust gas purification apparatus for an internal combustion engine as set forth in claim 3, wherein
a catalyst for reducing NOx by using ammonia as a reducing agent is arranged in said exhaust passage at a location downstream of said disperser; and said physical quantity is the rate of NOx reduction in said catalyst.

8. The exhaust gas purification apparatus for an internal combustion engine as set forth in claim 1, wherein
said controller further configured to calculate the amount of the precursor of ammonia or the amount of ammonia to be added from said addition valve based on an operating state of said internal combustion engine, and add the amount of the precursor of ammonia or the amount of ammonia thus calculated from said addition valve, in the case of limiting the calculation of the amount of the precursor of ammonia or the amount of ammonia to be added from said addition valve based on the detection value of said sensor, or in the case of limiting the calculation of the rate of NOx reduction based on the detection value of said sensor.

9. The exhaust gas purification apparatus for an internal combustion engine as set forth in claim 1, wherein
said sensor is arranged in a position at which the precursor of ammonia or the ammonia, which is added from said addition valve when the flow rate of the exhaust gas flowing through said exhaust passage is equal to or more than said predetermined flow rate, arrives at the time when the direction of the flow of the exhaust gas is changed by said disperser.

10. The exhaust gas purification apparatus for an internal combustion engine as set forth in claim 1, wherein
said controller further configured to correct at least one of the detection value of said sensor, the amount of the precursor of ammonia or the amount of ammonia to be added from said addition valve calculated based on the detection value of said sensor, and the rate of NOx reduction calculated based on the detection value of said sensor, at the time of limiting the calculation of the amount of the precursor of ammonia or the amount of ammonia to be added from said addition valve based on the detection value of said sensor, or at the time of limiting the calculation of the rate of NOx reduction based on the detection value of said sensor.

* * * * *